(12) United States Patent
Jee

(10) Patent No.: US 7,407,044 B2
(45) Date of Patent: Aug. 5, 2008

(54) VARIABLE DAMPING VALVE OF SHOCK ABSORBER

(75) Inventor: Young Whan Jee, Gyeonggi-do (KR)

(73) Assignee: Mando Corporation, Seoul (KR)

( * ) Notice: Subject to any disclaimer, the term of this patent is extended or adjusted under 35 U.S.C. 154(b) by 37 days.

(21) Appl. No.: 11/268,719

(22) Filed: Nov. 8, 2005

(65) Prior Publication Data
US 2008/0006493 A1 Jan. 10, 2008

(30) Foreign Application Priority Data
Nov. 9, 2004 (KR) .................. 10-2004-0090724

(51) Int. Cl.
F16F 9/34 (2006.01)
(52) U.S. Cl. .................. 188/322.15; 188/282.5; 188/266.6
(58) Field of Classification Search ............ 188/322.13, 188/322.15, 322.22, 281, 282.1, 282.2, 282.5, 188/282.6, 313, 318, 266.5, 166.6
See application file for complete search history.

(56) References Cited

U.S. PATENT DOCUMENTS 4,789,051 A * 12/1988 Kruckemeyer et al. ... 188/282.4
5,325,942 A * 7/1994 Groves et al. ............ 188/282.6
5,699,885 A * 12/1997 Forster ..................... 188/317
5,975,258 A * 11/1999 Nezu et al. .............. 188/322.15
6,860,369 B2 * 3/2005 Weiffen et al. ........... 188/282.4
2002/0189914 A1 * 12/2002 Naples et al. ........... 188/322.15
2005/0045440 A1 * 3/2005 Kock et al. ............. 188/322.15

FOREIGN PATENT DOCUMENTS

JP 10-141416 5/1998
KR 10-0253850 1/2000

* cited by examiner

Primary Examiner—Xuan Lan Nguyen
(74) Attorney, Agent, or Firm—McDermott Will & Emery LLP

(57) ABSTRACT

A variable damping valve of a shock absorber is capable of properly adjusting a damping force according to read conditions, travel conditions and the like while a vehicle is traveling, thereby improving ride comfort and control stability. A flow of oil is controlled to generate a damping force and the damping force is simultaneously adjusted according to pressure in a pilot chamber. The damping valve comprises an upper retainer communicating with a high-pressure side and a main valve installed below the upper retainer. The main valve comprises a valve body defining a pilot chamber, a disk ring installed on a top surface of the valve body, and a housing for containing the valve body and the disk ring and integrally confining the valve body and the disk ring by being curled at upper and lower ends of the housing.

6 Claims, 4 Drawing Sheets

【Fig. 1】
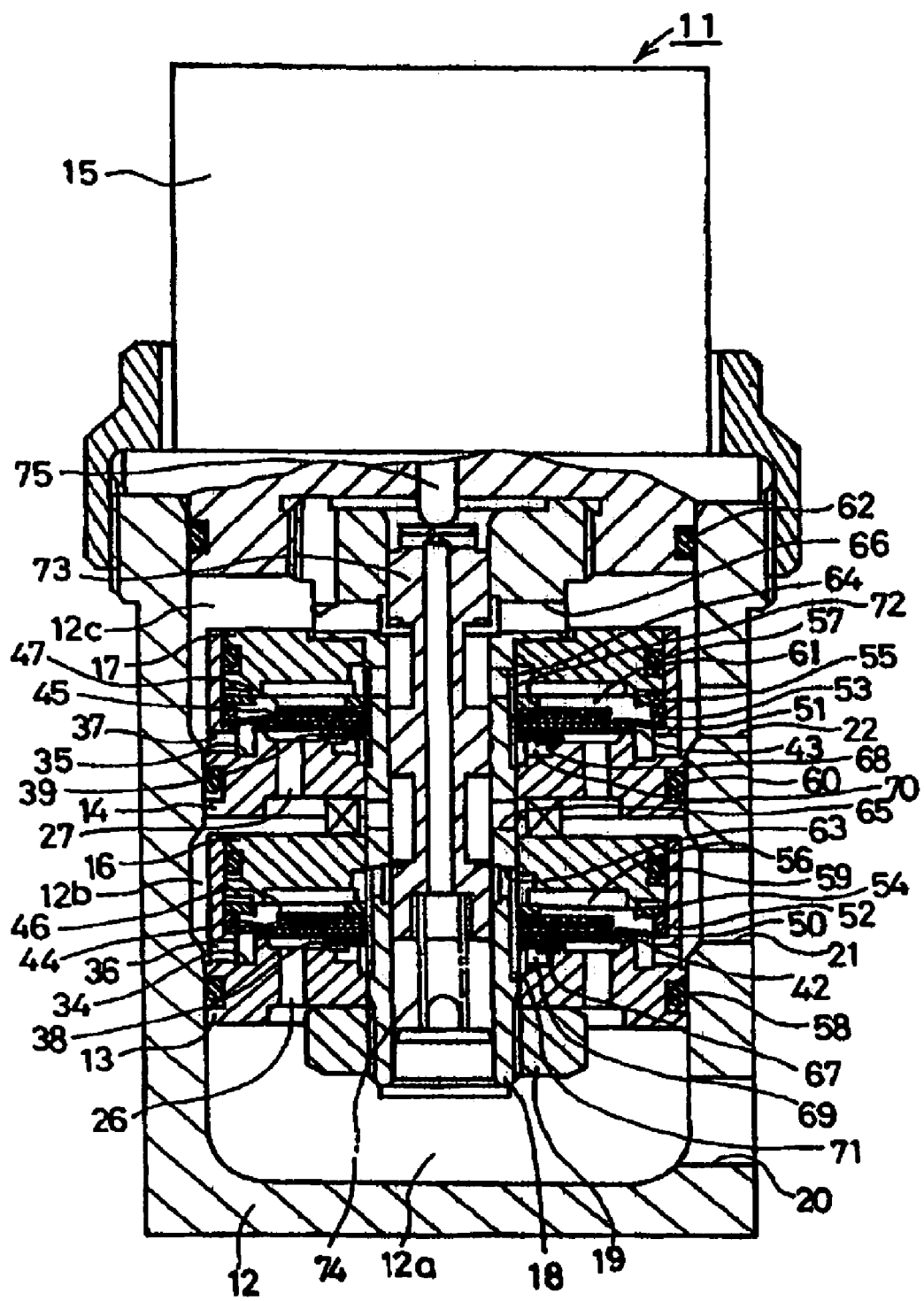
< Prior Art >

[Fig. 2]
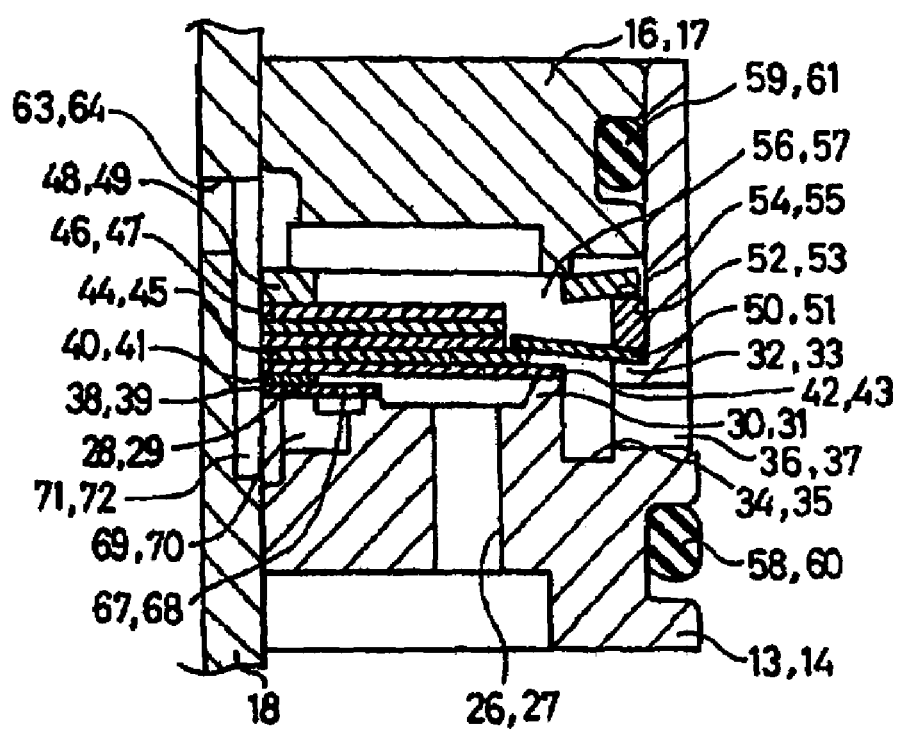
< Prior Art >

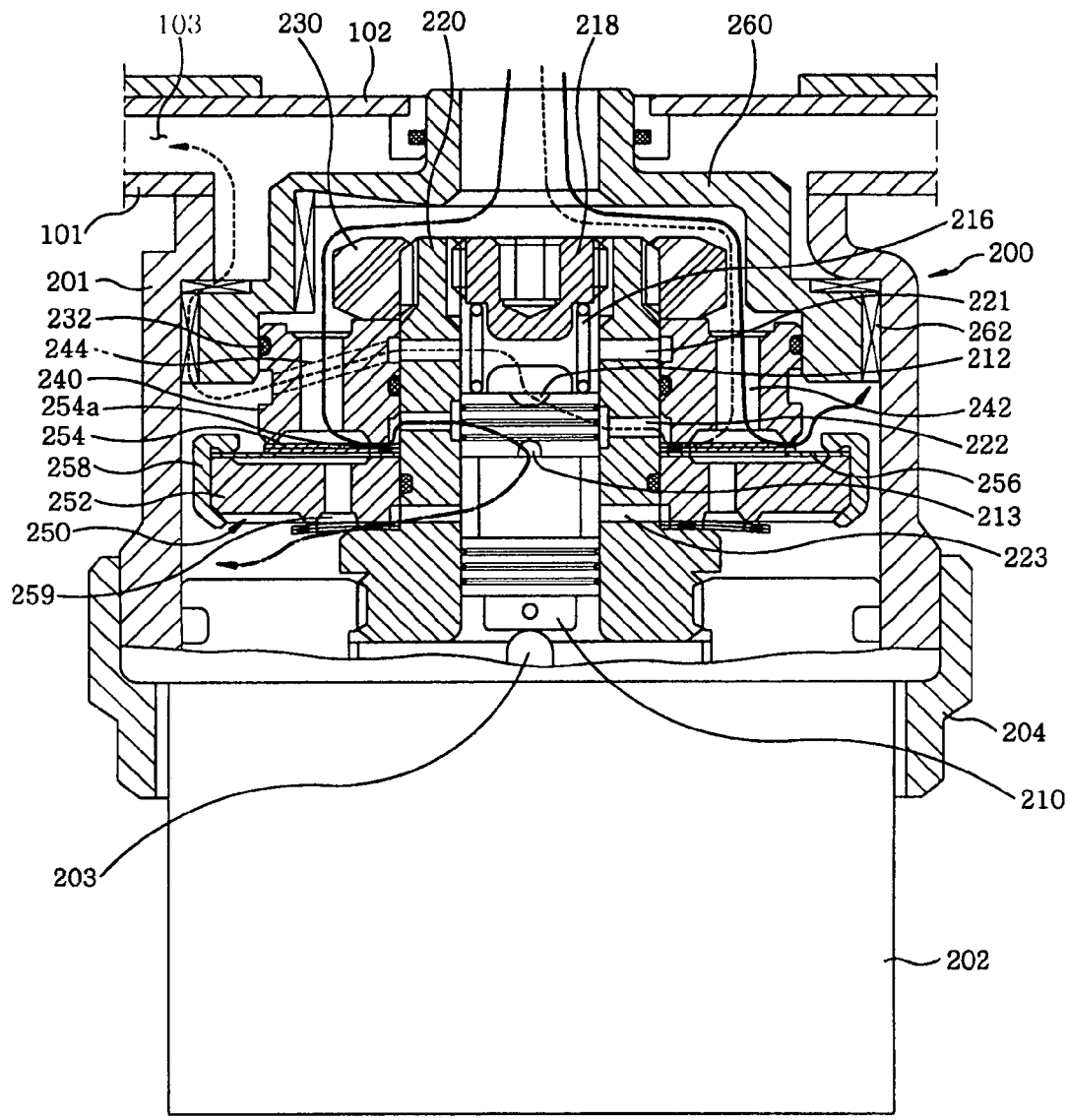
[Fig. 3]

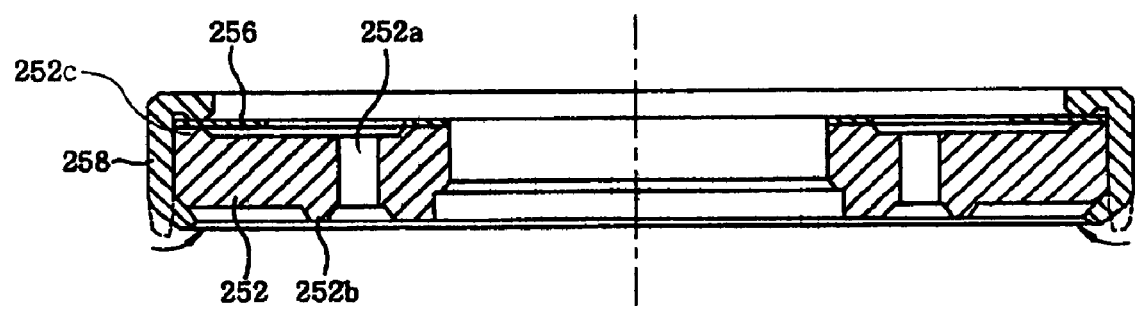
[Fig. 4]

VARIABLE DAMPING VALVE OF SHOCK ABSORBER

BACKGROUND OF THE INVENTION

1. Field of the Invention

The present invention relates to a variable damping valve of a shock absorber, and more particularly, to a shock absorber mounted with a variable damping valve capable of properly adjusting a damping force according to road conditions, travel conditions and the like while a vehicle is traveling, thereby improving ride comfort and control stability.

2. Description of the Related Art

A shock absorber of a suspension system mounted in a vehicle is a vibration-proof and shock-absorbing apparatus installed between an axle and a vehicle body to improve ride comfort by absorbing a vibration or shock transmitted from a road to the axle when the vehicle travels. The interior of the shock absorber is filled with oil and/or gas.

Shock absorbers include a variable damping shock absorber adapted to properly adjust a damping characteristic according to road and travel conditions so as to improve ride comfort or control stability. The variable damping shock absorber has a configuration in which a variable damping valve for adjusting a damping force is provided at a side surface of an outer tube of a conventional shock absorber.

Conventional variable damping valves are classified into a normal type variable valve and a reverse type variable valve according to methods of controlling a damping force in response to the movement of a vehicle. The reverse type variable valve is characterized in that compression and extension strokes are controlled by an additional valve in response to the movement of a vehicle. Thus, in the reverse type variable valve, a weak damping force is generated during the extension stroke and a strong damping force is generated during the compression stroke, or a strong damping force is generated during the extension stroke and a weak damping force is generated during the compression stroke. However, since the reverse type variable valve employs such an additional valve, there are disadvantages in that production costs thereof increase and the use of the additional valve results in a relatively larger size and deteriorated mountability.

In the normal type variable valve, a single valve is used to control damping forces during both the compression and extension strokes. Thus, in the normal type variable valve, strong damping forces or weak damping forces are generated during both the compression and extension strokes.

A conventional reverse type variable valve is disclosed in Korean Patent Application No. 1997-58101 entitled "Damping force-adjustable hydraulic shock absorber," wherein a damping force generating valve 11 is connected to a side of a variable damping shock absorber 1. The damping force generating valve will be described with reference to FIG. 1.

Since compression-side and extension-side valve mechanisms of the damping force generating valve 11 have the substantially same structure, an enlarged view common to them is shown in FIG. 2.

As shown in the figures, the damping force generating valve 11 is constructed in such a manner that two bottomed cylindrical valve bodies 13 and 14 are fitted into a bottomed cylindrical case 12, a proportional solenoid actuator 15 (hereinafter, referred to as "actuator 15") is mounted in an opening of the case 12, and the interior of the case 12 is partitioned into three fluid chambers 12a, 12b and 12c by the valve bodies 13 and 14.

Annular sealing members 16 and 17 are fitted into openings of the valve bodies 13 and 14, respectively, and a cylindrical guide member 18 threadly coupled to the actuator 15 penetrates through the valve bodies 13 and 14 and the sealing members 16 and 17 and is then secured by a nut 19. A sidewall of the case 12 is provided with connection holes 20, 21 and 22 communicating respectively with the fluid chamber 12a, 12b and 12c. The connection holes 20, 21 and 22 are connected to a cylinder through flow passages of the shock absorber, respectively.

A plurality of circumferentially arranged flow passages 26 and 27 (inlet passages) (only two flow passages are shown in FIG. 1) are formed at lower portions of the valve bodies 13 and 14 to axially penetrate through the valve bodies, respectively. Further, on an inner wall at the lower portion of each of the valve bodies 13 and 14, an annular inner sealing part 28 or 29 (see FIG. 2) is provided to protrude at an inner peripheral side of the passage 26 or 27, an annular valve seat 30 or 31 (see FIG. 2) is provided to protrude at an outer peripheral side of the passage 26 or 27, and an annular outer sealing part 32 or 33 (see FIG. 2) is provided outside the annular valve seat 30 or 31 and in the vicinity of a sidewall of the valve body 13 or 14. Annular grooves 34 and 35 are formed between the valve seats 30 and 31 and the outer sealing parts 32 and 33, respectively. The grooves 34 and 35 communicate with the fluid chambers (as at 12b and 12c in FIG. 1) through flow passages 36 and 37 (outlet passages), respectively.

As shown in FIG. 2, a disk-shaped orifice plate 38 or 39, which will be described later, and a spacer 40 or 41 are stacked on the inner sealing part 36 or 37 of each of the valve bodies 13 and 14. A disk valve 42 or 43 is stacked thereon; a retainer disk 44 or 45 with a diameter slightly smaller than that of the disk valve 42 or 43 is additionally stacked thereon; a plurality of disk-shaped leaf springs 46 or 47 (spring means) (only three leaf springs are shown in the figure) with a diameter smaller than that of the retainer disk 44 or 45, and a spacer 48 or 49 are further stacked thereon; and an outer periphery of the disk valve 42 or 43 is placed on the valve seat 30 or 31.

A flexible sealing ring 50 or 51 is fitted into the valve body 13 or 14. An inner periphery of the flexible sealing ring comes into contact with an outer periphery of the retainer disk 44 or 45 while slightly overlapping with each other, and an outer periphery of the flexible sealing ring comes into contact with the outer sealing part 32 or 33. A retainer ring 52 or 53 comes into contact with the top of the outer periphery of the flexible sealing ring 50 or 51, and an outer periphery of an annular sealing spring 54 or 55 comes into contact with the top of the retainer ring. The sealing member 16 or 17 fitted into the valve body 13 or 14 is in contact with the inner peripheries of the spacer 48 or 49 and the sealing spring 54 or 55, and secures the inner peripheries of the disk valve 42 or 43, the retainer disks 44 or 45 and the leaf springs 46 or 47 to the inner sealing part 28 or 29 and simultaneously secures the outer periphery of the sealing ring 50 or 51 to the outer sealing part 32 or 33.

The sealing member 16 or 17, the retainer disk 44 or 45, and the sealing ring 50 or 51 define a pilot chamber 56 or 57 at the rear of the disk valve 42 or 43 within the valve body 13 or 14. At this time, the sealing spring 54 or 55 seals a gap between the valve body 13 or 14 and the sealing member 16 or 17. Further, to securely seal a contact portion of the retainer disk 44 or 45 and the sealing ring 50 or 51, the sealing ring 50 or 51 is assembled in such a manner that the outer periphery thereof is at a level slightly lower than that of the inner periphery thereof with respect to the bottom of the valve body 13 or 14, thereby pressing down the retainer disk 44 or 45. In the figures, reference numerals 58, 59, 60, 61 and 62 designate O-rings.

A sidewall of the guide member 18 is provided with ports 63 and 64 communicating respectively with the pilot chambers 56 and 57, and ports 65 and 66 communicating respectively with the fluid chambers 12b and 12c. The orifice plate 38 or 39 mounted on the inner sealing part 28 or 29 is provided with fixed orifices 67 or 68. An upstream passage is constructed by the fixed orifices 67 or 68, a cut-away portion 69 or 70 of the inner sealing part and a groove 71 or 72 of an outer periphery of the guide member 18. With the upstream passage, the flow passage 26 or 27, and the port 63 or 64, i.e., pilot chamber 56 or 57, communicate with each other. A spool 73 is slidably fitted into the guide member 18 to adjust the area of the flow passage (downstream passage) between the port 63 or 65 and the port 64 or 66. The spool 73 is urged (forced) toward the actuator 15 by a compression spring 74 and is moved against the pressing force of the spring 74 by an actuating rod 75 of the actuator 15, so that the areas of flow passages of the port 63 and the port 66 (variable orifice) can be adjusted.

However, in such a conventional structure, the respective pilot chambers 56 and 57 formed at the rears of the disk valves 42 and 43 within the valve bodies 13 and 14 by being partitioned by the sealing members 16 and 17, the retainer disks 44 and 45, and the sealing rings 50 and 51 have a very complicated structure in which the sealing rings 50 and 51 are fixed by the retainers 52 and 53 placed thereon. If the retainers 52 and 53 have uneven top and bottom surfaces, unbalance occurs in the pressing forces of the retainers 50 and 51. This causes a problem in that pressure in the pilot chambers 56 and 57 becomes unstable, resulting in dispersion of a damping force. That is, the occurrence of the dispersion in the pilot chambers 56 and 57 greatly deteriorates the performance of the shock absorber.

SUMMARY OF THE INVENTION

The present invention is conceived to solve the aforementioned problems in the prior art. Accordingly, an object of the present invention is to provide a variable damping valve of a shock absorber, wherein a main valve of a damping force generating valve is more simplified in structure and the occurrence of dispersion of a damping force in a pilot chamber is suppressed.

According to the present invention for achieving the object, there is provided a variable damping valve of a shock absorber, comprising an upper retainer communicating with a high-pressure side, and a main valve installed below the upper retainer, wherein the main valve comprises a valve body defining a pilot chamber therein, a disk ring installed on a top surface of the valve body, and a housing for containing the valve body and the disk ring therein and integrally confining the valve body and the disk ring by being curled at upper and lower ends of the housing, whereby a flow of oil is controlled to generate a damping force and the damping force is simultaneously adjusted according to pressure in the pilot chamber in a state where dispersion of the damping force is reduced in the pilot chamber.

BRIEF DESCRIPTION OF THE DRAWINGS

The above and other objects, features and advantages of the present invention will become apparent from the following description of a preferred embodiment given in conjunction with the accompanying drawings, in which:

FIG. 1 is a sectional view showing a conventional reverse type variable damping valve;

FIG. 2 is an enlarged view of a portion of the variable damping valve of FIG. 1;

FIG. 3 shows a damping force generating valve in a variable damping shock absorber according to the present invention; and FIG. 4 is an enlarged view of a main valve of the damping force generating valve according to the present invention.

DESCRIPTION OF THE PREFERRED EMBODIMENT

Hereinafter, a preferred embodiment of the present invention will be described in detail with reference to the accompanying drawings.

FIG. 3 shows a damping force generating valve in a variable damping shock absorber according to the present invention, and FIG. 4 is an enlarged view of a main valve of the damping force generating valve according to the present invention.

As shown in FIG. 3, the damping force generating valve 200 installed at a side of a base shell 101 of the shock absorber comprises a case 201 installed to communicate with the base shell 101; and a spool 210 and a spool rod 220, an upper retainer 240 and a main valve 250 fitted around an outer peripheral surface of the spool rod 220, and an upper retainer guide 260, which are included in the case 201.

Further, an actuator 202 is fixed to one end of the case 201 by means of a nut 204.

The spool 210, which is inserted into and slidably moved in a hollow of the spool rod 220 to be described later, is moved by an actuating rod 203 of the actuator 202, which is inserted into the spool rod 220, while the spool compresses a spring 216 disposed in front of the spool. The spool 210 has a plurality of stepped portions with different outer diameters in a vertical direction. Among the stepped portions, a stepped portion with a larger outer diameter is formed with first and second variable orifices 212 and 213.

The first variable orifice 212 is constructed to have a higher rate of change in area than that of the second variable orifice 213 when the spool 210 reciprocates.

The initial position of the spool 210 is adjusted by means of a plug 218 by which the spring 216 is supported.

The spool rod 220 for guiding the movement of the spool 210 has a cylindrical hollow and includes a plurality of connection ports 221, 222 and 223 in a radial direction.

The ring-shaped upper retainer 240 and the main valve 250 sequentially fitted and stacked around the outer peripheral surface of the spool rod 220 are fixed in a tight contact state using a nut 230, and a sealing member 232 is installed at the tightly contacted portion to achieve sealing.

The upper retainer 240 includes primary passages 242 for connection with a high-pressure side, which are vertical through-holes formed equidistantly on a concentric circle, and secondary passages 244 formed in a radial direction perpendicular to the primary passages 242.

An outer portion of the upper retainer 240 is partially contained in the upper retainer guide 260 that communicates with a separator tube 102.

Further, the upper retainer guide 260 is circumferentially formed with a plurality of flow passage grooves 262 in an outer peripheral surface thereof, so that oil can be introduced into a space between the base shell 101 and the separator tube 102, i.e., a reservoir 103 constituting a low-pressure side.

Meanwhile, the main valve 250 shown in FIG. 4 is fitted around the spool 210 such that it is disposed below the upper retainer 240. The main valve 250 controls the flow of oil introduced into the primary passages 242 to generate a damping force and simultaneously adjusts the damping force according to pressure in a pilot chamber 259.

As shown in the figure, the main valve 250 is preferably constructed as a single unit comprising a valve body 252, multi-disks 254, a disk ring 256 and a housing 258.

The valve body 252 is formed with a plurality of vertical flow passages 252a on a concentric circle, and has seat surfaces 252b 252c formed to protrude from upper and lower surfaces of the valve body.

The disk ring 256 is seated on the upper seat surface 252c, and the multi-disks 254 are installed on the disk ring 256 and the lower seat surface 252b. A plurality of slits 254a for guiding the flow of oil are circumferentially formed on the multi-disks 254.

Here, the slits 254a of the disks 254 serve as fixed orifices.

To integrally confine the disk ring 256 to the vale body 252, the housing 258 is installed around an outer peripheral surface of the valve body 252 with the disk ring 256 stacked thereon.

The housing 258 is in the form of a hollow cylinder with open top and bottom. The stacked disk ring 256 and valve body 252 are inserted into the housing 258 and then integrated together by curling or caulking upper and lower ends of the housing.

In designing the housing 258, it is preferred that upon curling or caulking, the housing 258 be adapted to press down the disk ring 256 with a certain force at a fixed position.

The operation of the variable damping valve of the shock absorber according to the present invention constructed as above is as follows.

The flow of oil will be discussed by referring back to FIG. 3. With the movement of a piston, the oil is introduced toward an inlet side of the upper retainer guide 260 communicating with the high-pressure side of the shock absorber, and the introduced oil moves to the primary passages 242 of the upper retainer 240.

At this time, in case of a damping force in a soft mode which is established at a low speed and in which the flow rate of the oil is not high, as designated by a dotted line, some of the oil is introduced into the connection port 222 through the slits 254a of the disks 254 of the main valve 250. Then, the oil is moved by means of the actuating rod 203 of the actuator 202, so that the oil is moved into the spool rod 220 through the first variable orifice 212 of the spool 210 in a state where the first variable orifice is opened, and then moved to the secondary passages 244 of the upper retainer 240 through the hollow of the spool rod 220 and the connection port 221.

The oil that has passed through the secondary passages 244 is drained into the reservoir 103, i.e., low-pressure side, through the flow passage grooves 262 of the upper retainer guide 260.

The term "high-pressure side" used herein means a portion connected to an extension chamber of the cylinder, and the term "low-pressure side" means a portion connected to the reservoir 103.

Meanwhile, the oil, which has been introduced into the primary passages 242 while the flow rate thereof increases during the extension or compression stroke, sequentially passes through the slits 254a of the disks 254, the connection port 222 of the spool rod 220, the second variable orifice 213 of the spool 210, and the connection port 223 of the spool rod 220 to the pilot chamber 259. Some of the moved oil (designated by a one-dot chain line) moves to the flow passage grooves 262 of the upper retainer guide 260 through the slits 254a of the disks 254.

The oil, which has not passed through the fixed orifices, i.e., the slits 254a of the disks 254, remains in the pilot chamber 259 on the side of the flow passage grooves 262.

If a difference in pressure between the high-pressure side and the pilot chamber 259 increases due to increase of the flow rate during the existence or compression stroke, a force generated due to the pressure difference causes the disks 254 and the disk ring 256 to be bent toward the pilot chamber 259. Thus, according to the pressure at the high-pressure side, the pressure in the pilot chamber 259 and initial preload on the disk ring 256, a gap is produced between the upper seat surface 252c of the upper retainer 240 and the disks 254 so that the oil (designated by a solid line) can flow directly from the high-pressure side to the low-pressure side.

If the flow rate decreases during the extension or compression stroke, the difference in pressure between the high-pressure side and the pilot chamber 259 decreases and the disk 254 return to the original state, so that the gap between the upper seat surface 252c and the disk 254 disappears.

Therefore, a main flow passage opened by the disks 254 is opened at different pressure according to the pressure in the pilot chamber 259. The pressure in the pilot chamber 259 is generated by means of the operation of the second variable orifice 213 installed above the pilot chamber and the operation of the slits 254a of the disks 254 installed below the pilot chamber. The area of the second variable orifice 213 is controlled to increase the pressure in the pilot chamber 259, thereby achieving switching to a hard mode. Further, the provision of the first variable orifice 212 having a higher rate of change in area than that of the second variable orifice 213 allows a flow from the high-pressure side to the low-pressure side. As the area of the second variable orifice 213 increases, the area of the first variable orifice 212 deceases. As the area of the second variable orifice 213 decreases, the area of the first variable orifice 212 increases.

With such a characteristic, in the hard mode, it is possible to secure a characteristic by which the entire flow rate at a low speed region before blow-off timing is low than that in the soft mode under the same pressure condition. Even though the operating area of the high-pressure side is smaller than that of the pilot chamber 259, such a structure enables the occurrence of blow-off timing in the hard mode at a low flow rate and high pressure. Since a proper damping force characteristic can be obtained irrespective of the area, there is an advantage in that the structure of the main valve 250 can be more simplified.

Moreover, there is an advantage in that it is possible to greatly reduce the occurrence of dispersion of a damping force in the pilot chamber 259 due to force unbalance by the disk ring 256 which is formed integrally with and acts on the valve body 252 with a uniform force in the main valve 250.

In the variable damping valve 200 improved as above, the structure is simplified as well as the occurrence of the dispersion in the pilot chamber 259 is reduced.

In the variable damping valve of a shock absorber according to the present invention described above, the structure of the main valve of the variable damping valve is more simplified, and the occurrence of dispersion of a damping force in the pilot chamber is reduced, thereby obtaining a stable damping force and improving the performance of the shock absorber.

The foregoing is merely an embodiment for implementing the variable damping valve of a shock absorber according to the present invention. The present invention is not limited to the embodiment. It will be apparent that those skilled in the art can make modifications and changes thereto without departing from the scope and technical spirit of the present invention defined by the appended claims.

What is claimed is:

1. A variable damping valve of a shock absorber, wherein a flow of oil is controlled to generate a damping force and the damping force is simultaneously adjusted according to pressure in a pilot chamber in a state where dispersion of the damping force is reduced in the pilot chamber, the shock absorber comprising:

an upper retainer communicating with a high-pressure side, and a main valve installed below the upper retainer, wherein the main valve comprises a valve body defining the pilot chamber therein, a disk ring installed on a top surface of the valve body, and a housing that contains the valve body and the disk ring therein and integrally confines the valve body and the disk ring by an upper end of the housing being curled directly above the disk ring and a lower end of the housing being curled directly below the valve body.

2. The variable damping valve as claimed in claim 1, wherein the valve body has vertical flow passages.

3. The variable damping valve as claimed in claim 1, wherein multi-disks are further installed on the top surface of the disk ring.

4. The variable damping valve as claimed in claim 3, wherein the multi-disks are formed with a plurality of slits for guiding the flow of the oil.

5. The variable damping valve as claimed in claim 1, further comprising an upper retainer guide installed to partially contain an outer portion of the upper retainer, the upper retainer guide communicating with a lower-pressure side.

6. The variable damping valve as claimed in claim 5, wherein the upper retainer guide has a plurality of flow passage grooves formed circumferentially in an outer peripheral surface thereof.

* * * * *